REEL COVER AND APPARATUS FOR MOUNTING ON A REEL

Filed July 6, 1965

3 Sheets-Sheet 1

INVENTOR
ARNOLD P. HULTGREN
BY Bair, Freeman & Molinare Attys.

REEL COVER AND APPARATUS FOR MOUNTING ON A REEL

Filed July 6, 1965

INVENTOR
ARNOLD P. HULTGREN
BY Bair, Freeman & Molinare Attys.

REEL COVER AND APPARATUS FOR MOUNTING ON A REEL

Filed July 6, 1965

3 Sheets-Sheet 3

INVENTOR
ARNOLD P. HULTGREN
BY Bair, Freeman & Molinare Attys.

United States Patent Office 3,375,990
Patented Apr. 2, 1968

3,375,990
REEL COVER AND APPARATUS FOR MOUNTING ON A REEL

Arnold P. Hultgren, River Forest, Ill., assignor to Amerline Corporation, Chicago, Ill., a corporation of Illinois Filed July 6, 1965, Ser. No. 469,401
25 Claims. (Cl. 242—55.13)

ABSTRACT OF THE DISCLOSURE

A reel cover and apparatus for selectively moving the cover in and out of engagement with the flanges of the reel. The apparatus and the cover include cooperating means which cause the cover to move in and out of engagement with the reel flanges. The inner periphery of the reel cover is always maintained in alignment with the outer periphery of the reel flanges both in the open and closed position. In the closed position, dust sealing relationship is provided between the reel and the cover; and in the open position, while on a computer machine or the like, the dust sealing inner periphery of the cover is separated from but aligned with the outer periphery of the reel flanges.

This invention relates to an improved cover for a tape reel and it also relates to apparatus useful in connection with the improved tape reel cover for opening or closing the cover with respect to the reel.

There are many types of covers or containers useful for storing tape reels. It is important in these constructions that the enclosures prevent the passage of dust or other air-carried impurities onto the tape stored on the reel. Such contamination on magnetic tapes used in computers results in so-called "drop outs" or loss of information to the pick up head of the electronic unit. Some of the prior tape reel covers or containers, although effective, are quite complex in construction and expensive to manufacture. Therefore, it is highly desirable that all tape reel enclosures completely protect the tape from contact with air-carried impurities, and at the same time, be of simple and economical construction.

Although there are known tape reel enclosures which accomplish one or both of the aforementioned characteristics, regardless of their particular design, they all have at least one significant drawback: All require manual separation of the reel from the enclosure and manual positioning of the reel on the computer or other apparatus; similar handling is required for re-positioning the reel in the enclosure. This manual handling causes damage to the lateral edges of the tape wound on the reel since it is common for some of the tape convolutions to project laterally from the main body of aligned tape convolutions on the reel. As a result, the manual handling of the reel by the operator, commonly causes the flanges to move inwardly slightly, and crush the edges of the projecting convolutions of the tape. The damaged edges interfere with the smooth passage and accurate positioning of the tape with respect to the magnetic head and may result in an inaccurate "writing" or "heading" due to the distance between the tape and the head.

Therefore, it is an important object of this invention to provide an improved cover for completely enclosing a tape reel during storage and which avoids problems associated with prior art tape reel covers or containers.

It is also an object of this invention to provide novel apparatus, useful in combination with my improved reel cover, which effects either opening or closing of the cover on the reel.

It is a further object of this invention to provide an improved tape reel cover wherein integral means are provided thereon for cooperating with structure integral with the machine which uses the tape in order to cause opening or closing of the cover with respect to the reel in response to manual rotation of the cover with respect to the reel.

It is another object of this invention to provide an expansible cover for tightly enclosing a tape reel about the periphery of its opposed flanges and novel apparatus, useful in connection therewith, which removes the cover from or mounts it on the reel without compressing the flanges and crushing the edge portions of tape disposed therebetween.

It is yet a further object of this invention to provide an improved tape reel cover construction wherein integral means are provided on the cover for cooperating with novel apparatus, integral with a machine which uses the tape, for automatically effecting an opening or closing of the cover with respect to the tape reel.

It is still another object of this invention to provide novel apparatus for automatically separating a tape reel cover from the reel while the reel is mounted upon the spindle of a computer or the like and also for repositioning the cover upon the reel after the tape has been rewound upon the reel.

It is still another object of this invention to provide a novel combination of a tape reel cover and apparatus for effecting opening or closing of the cover on the reel, wherein both the cover and apparatus are characterized by their simplicity and economy of construction, manufacture and operation.

Further purposes and objects of this invention will appear as the specification proceeds.

A particular embodiment of the present invention is illustrated in the accompanying drawings wherein.

Figure 5:
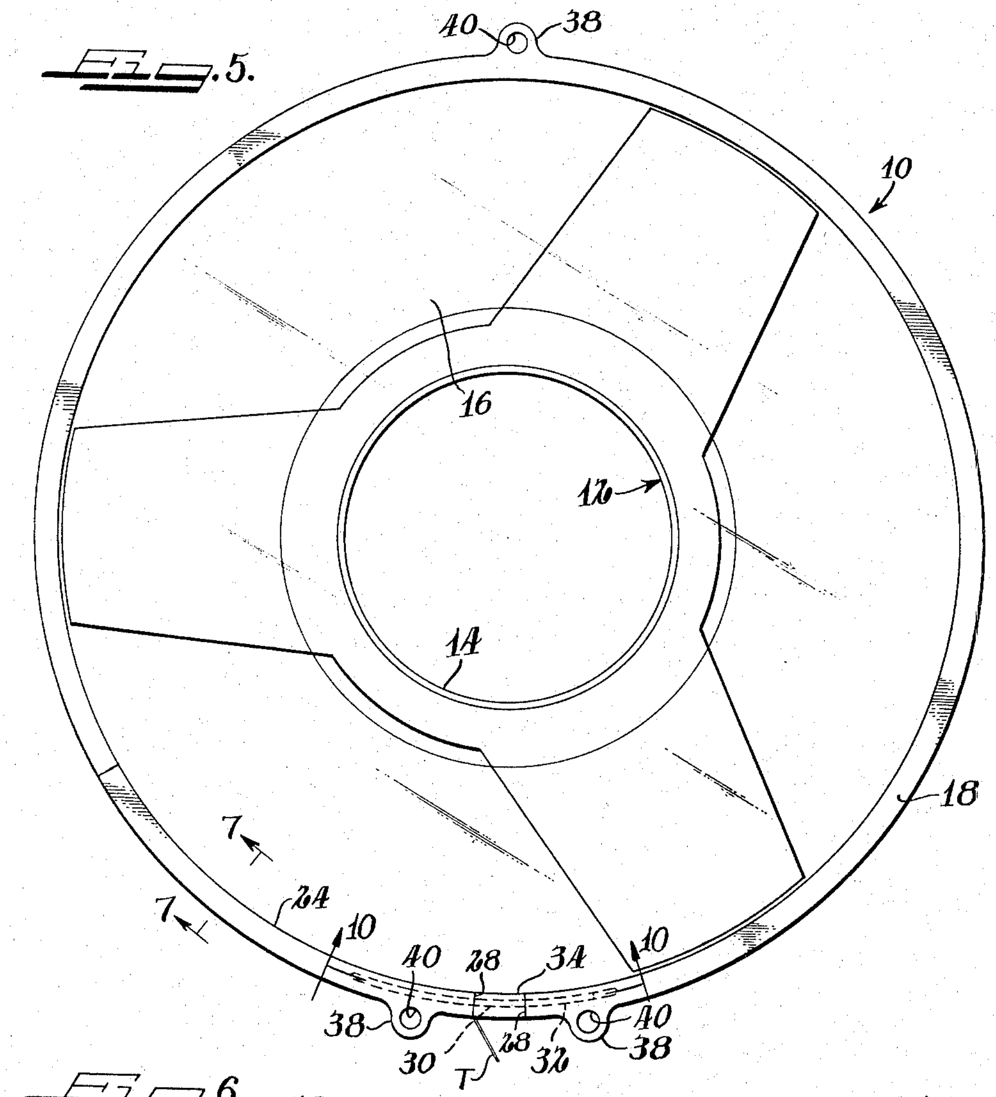
FIGURE 5 is an enlarged top plan view of my improved tape reel cover mounted upon a tape reel.
Figures 6, 7:
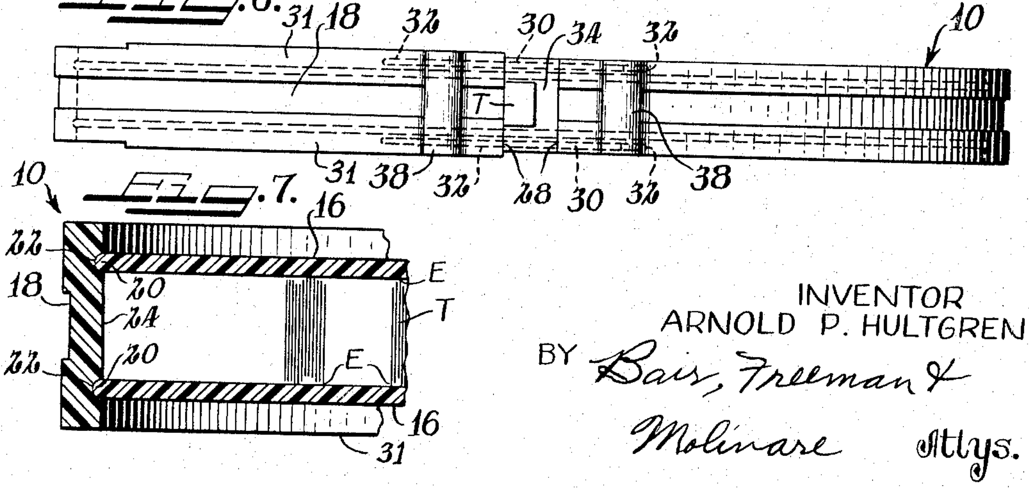
FIGURE 6 is a front elevational view of the embodiment of FIGURE 5.
FIGURE 7 is a sectional view taken along the line 7—7 of FIGURE 5.

Referring to the drawings, one embodiment of my improved cover 10 for a tape reel 12 is shown most clearly in FIGURES 5–7. The reel 12 includes a hub 14 and a pair of spaced or substantially puarallel flanges 16 which project outwardly from the hub 14. Tape T, as seen in FIGURE 7, is wound around the hub 14 and is maintained in a stacked condition between the flanges 16. As seen, the tape T may be wound unevenly upon the hub 14 so that edges E of some of the convolutions of the tape project laterally from the stacked tape. It is these edge portions which are subjected to crushing when the operator handles the reel and causes the flanges 16 to be squeezed together. It is this problem which my invention is particularly effective in overcoming.

The cover 10 is radially expansible and includes a wrap-around portion 18 which substantially conforms to the outer periphery 20 of each of the flanges 16 and completely encloses the space between the flanges 16 whereby dust and air-carried impurities are prevented from coming into contact with the tape stored on the reel 12. Preferably the cover 10 is molded of a plastic material which is effective in withstanding relatively high impacts, such as nylon, polystyrene or the like. The wrap-around or web portion 18 of the cover 10 is continuous and is provided with a pair of substantially parallel and continuous grooves 22 on the inner periphery 24 thereof. The grooves 22, as seen in FIGURE 7, receive the outer edges or peripheries 20 of the flanges 16 therein. The grooves 22 thereby maintain the outer edges 20 of the flanges 16 in spaced-apart relationship to avoid crushing of the edge portions E of the tape while the cover 10 is mounted upon the reel 12.

In order to maintain the opposite ends 28 of the wrap-around portion or web 18 in substantial alignment with each other whether the cover 10 is in position on the reel 12 or separated therefrom, a pair of outwardly projecting guide members 30 are provided in one of the ends 28. The guides 30 extend substantially circumferentially from one end portion 28 wherein each is secured, as by being embedded during the molding of the cover 10. The guide projections 30 are slidable within passageways 32 provided in the opposite end 28. Whether the cover 10 is mounted upon or separated from the reel 12, the projections 30 remain in engagement or registry with the passageways 32 so that alignment between the opposite ends 28 is maintained at all times. As seen in FIGURE 6, the end portion 28 in which the guide projections 30 are securely embedded has a widened portion 31 in order to rigidly support the projections 30, which are advantageously constructed of wire.

The spacing between the substantially parallel projections 30 is slightly greater than the width of the tape T so that the tape T may pass between the spaced projections 30 both when the cover 10 is mounted upon the reel 12 or is separated therefrom. It is desirable that a resilient sealing member 34 be provided for substantially sealing or enclosing the space formed between the opposite ends 28 of the wrap-around portion 18. One end of the seal 34, which may be expanded rubber, is secured, as by means of an adhesive, to one of the end portions 28, while the other end of the seal 34 abuts the opposite end of the wrap-around when the cover is closed. The free end of the tape is held between the seal 34 and the end 28 of the wrap-around 18. When the cover is expanded a slot 36 is formed between the seal and end portion 28 to permit the tape T to pass freely therethrough. The tape is, of course, narrower than the space between the projections 30.

For purposes to be hereinafter described, bossses or raised portions 38 are spaced along the outer periphery of the wrap-around portion 18; the bosses 38 have openings 40 therein which have their axes substantially parallel to the axes of both the cover 10 and reel 12. More specifically one boss 38 is located at each of the end portions 28 of the wrap-around 18 while a third boss 38 is positioned on the wrap-around 18 at a point intermediate the ends 28. The openings 40 cooperate with my novel apparatus 42 in order to effect an opening or closing of the cover 10 on the reel 12 after it has been mounted upon a computer machine or other apparatus 44 which reads or uses the information stored on the tape.

The apparatus 42 is shown most clearly in FIGURES 1–4, and includes a plate 52 which constitutes the frame or deck of the computer machine or other equipment 44 which uses the tape.

Figures 1, 2, 3, 4:
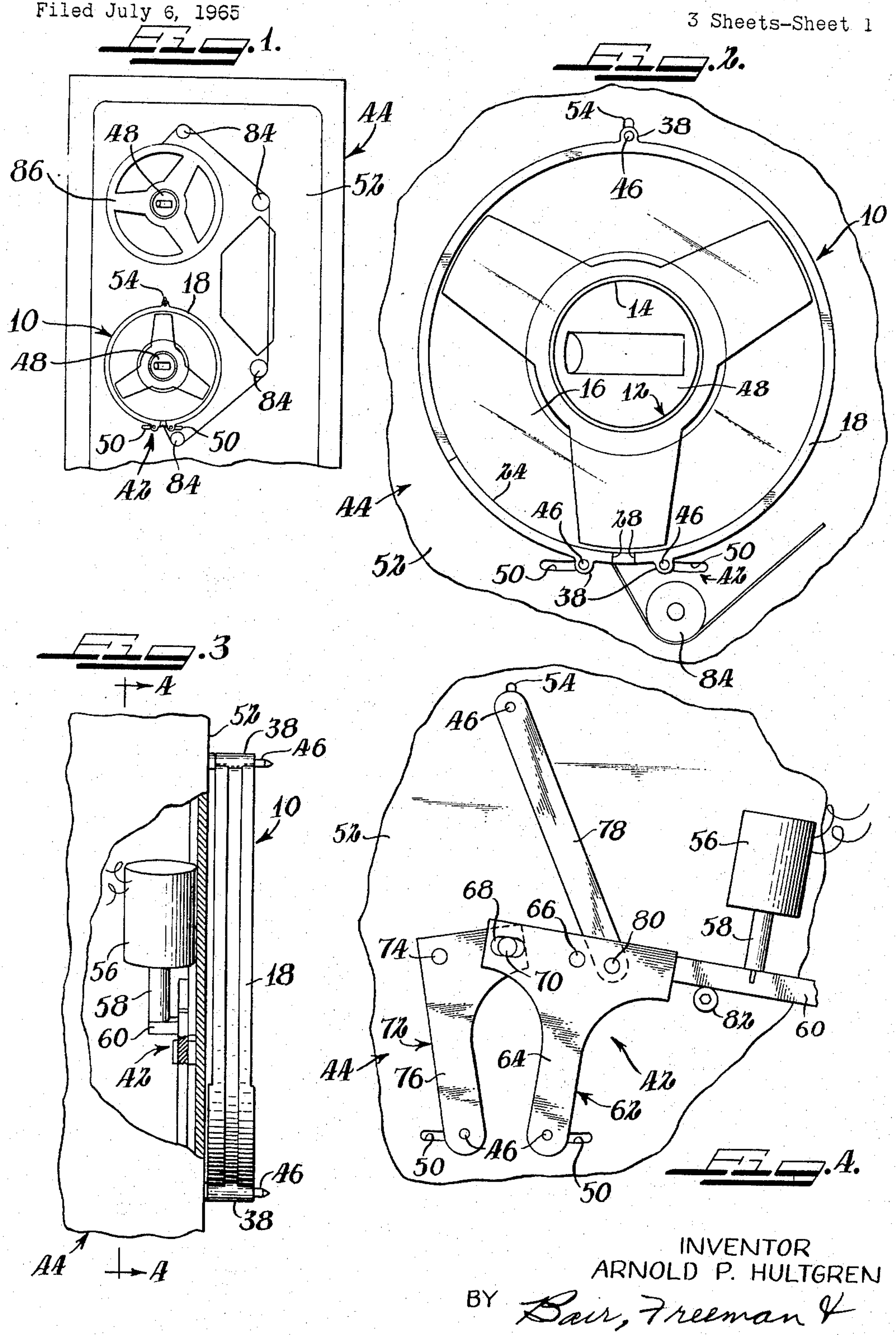
FIGURE 1 is a top plan view of my improved tape reel cover in position upon apparatus which may effect both an opening and a reclosing of the reel cover on the reel.
FIGURE 2 is an enlarged top plan view of my tape reel cover and the apparatus for effecting both an opening and a reclosing thereof with respect to a reel.
FIGURE 3 is a fragmentary side elevational view of the embodiment of FIGURE 2.
FIGURE 4 is a sectional view taken along the line 4—4 of FIGURE 3.

Referring particularly to FIGURES 2–4, movable upright pin members 46 are carried by the machine 44 exterior of the wrap-around portion 18 of the cover. Two pin members 46 register with the openings 40 at the ends 28 of the wrap-around portion 18 while a third pin member 46 registers with the opening 40 intermediate the ends 28 of the wrap-around 18. The pins 46 which are located at ends 28 are movable in slots 50 which are curved outwardly and opposite each other and which cut through the plate 52 of the machine 44, while the intermediate pin 46 moves outwardly or inwardly in the radial slot 54 in the plate 52.

When a tape reel 12 having a circumferential cover 10 thereon is placed upon a machine 44, in engagement with a spindle 48, the pins 46 engage or register with the openings 40 of the wrap-around 18 and the operator may then open the cover 10 on the reel 12 by moving the pins radially outwardly in the slots 50 and 54 and thereby move the cover 10 from the reel. This may be done automatically by suitable electro-mechanical means such as a solenoid 56 having an armature 58 secured to a pivoting arm 60. The arm 60 is secured to or integral with a T-shaped actuating member 62, to which one pin 46 is secured near the lower end of the central leg 64 of the T-shaped actuating member 62. The actuating member 62 in turn is pivotally carried by the plate 52, as by a pivot pin 66. One lateral portion of the top portion 67 of the actuating member 62 includes a slot 68 which slidably receives a pin member 70 therein, the pin 70 being secured to a cooperating pin actuating member 72. The cooperating member 72 is pivotally carried by the deck or plate 52, as by a pivot pin 74. The lower end of the leg 76 of the cooperating pin actuating member 72 has one pin member 46 securely fastened thereto. Both the pins 46 which are secured to the actuating members 62 and 72 project upwardly through the curved slots 50.

A link 78 is pivotally secured at 80 to the first actuating member 62 at a point intermediate the pivot pin 66 and the point of attachment of the arm 60 to the member 62. The link 78 also carries a pin member 46 at its outer end which pin projects upwardly through the radial slot 54 in the top plate 52. A stop member 82 is fixed to the under surface of the plate 52 and is provided so as to contact the arm 60 and prevent excessive movement thereof in response to movement of the solenoid armature 58.

In operation, an operator takes a reel 12 from storage with tape stored thereon and with the cover 10 sealably positioned therearound, carries the reel cover combination to the computer machine 44, and places the entire combination in an unopened condition upon the spindle or drive means 48 provided on the computer 44. In positioning the cover 10 and reel 12 on the machine 44, it is important that the pin members 46 be placed into registry with the apertures 40 in the outer periphery of the wrap-around 18. The operator may then grasp the outer end of the tape T projecting through the slit 36 of the sealing member 34 and the tape is passed around the guide rollers 84 provided on the computer machine 44. The tape T is then secured on the tape receiving reel 86, which is rotatably carried by the computer 44.

In order to permit the reel 12 to be rotated on the computer 44 by drive means, the cover 10 is to be released or separated from the reel 12. This may be accomplished by electro-mechanical means and simply by operating a switch (not shown) the solenoid 56 is actuated. The actuation of the solenoid 56 moves the armature 58 away from the stop 82; since the armature 58 is connected to the arm 60, it also moves in a counterclockwise direction and away from the stop 82. This movement pivots the first actuating member 62 about the pivot pin 66. Since the slot 68 in the first actuating member engages the pin 70 of the second actuating member 72, the pivoting of the first actuating member 62 pivots the second actuating member 72 about the pivot pin 74 in a clockwise direction. Also, since the link 78 is pivotally carried by the first actuating member 62, upon counterclockwise movement of the actuating member 62, the outer end of the link 78 is moved upwardly, as viewed in FIGURE 4. The described movement of the actuating members 62 and 72 and the link 78 effects corresponding movements of each of the pin members 46. The pins 46 which register with the openings 40 at the ends 28 of the wrap-around 18 move away from each other and also outwardly from the reel 12 in the curved slots 54; the pin 46 which registers with the opening 40 intermediate the wrap-around ends 28 is simultaneously moved radially outwardly from the reel 12.

Since the pin members 46 engage the three openings 40 in the wrap-around portion 18, the entire cover 10 is moved away from the reel 12, the final spacing of the cover 10 from the reel 12 being substantially equal at all points. The reel 12 is then free for rotation relative to the fixed cover. Whether the cover 10 is mounted upon or separated from the reel 12, the guide projections 30 maintain alignment between the opposite ends 28 of the wrap-around 18.

After the tape has been used and has been rewound upon the reel 12, the operator may de-activate the solenoid 56 so as to move the pins 46 in the slots 50 and 54 to their initial positions so that the cover 10 is moved back into covering relationship with the reel 12 and the grooves 22 are moved into dust-sealing relationship with the outer periphery 20 of each of the flanges 16; guide means on the cover may be provided for making certain that the peripheries 20 properly move into the grooves 22. The operator may then remove the cover 10 and reel 12 from the spindle 48 and place them in storage.

Figures 8, 9, 10:
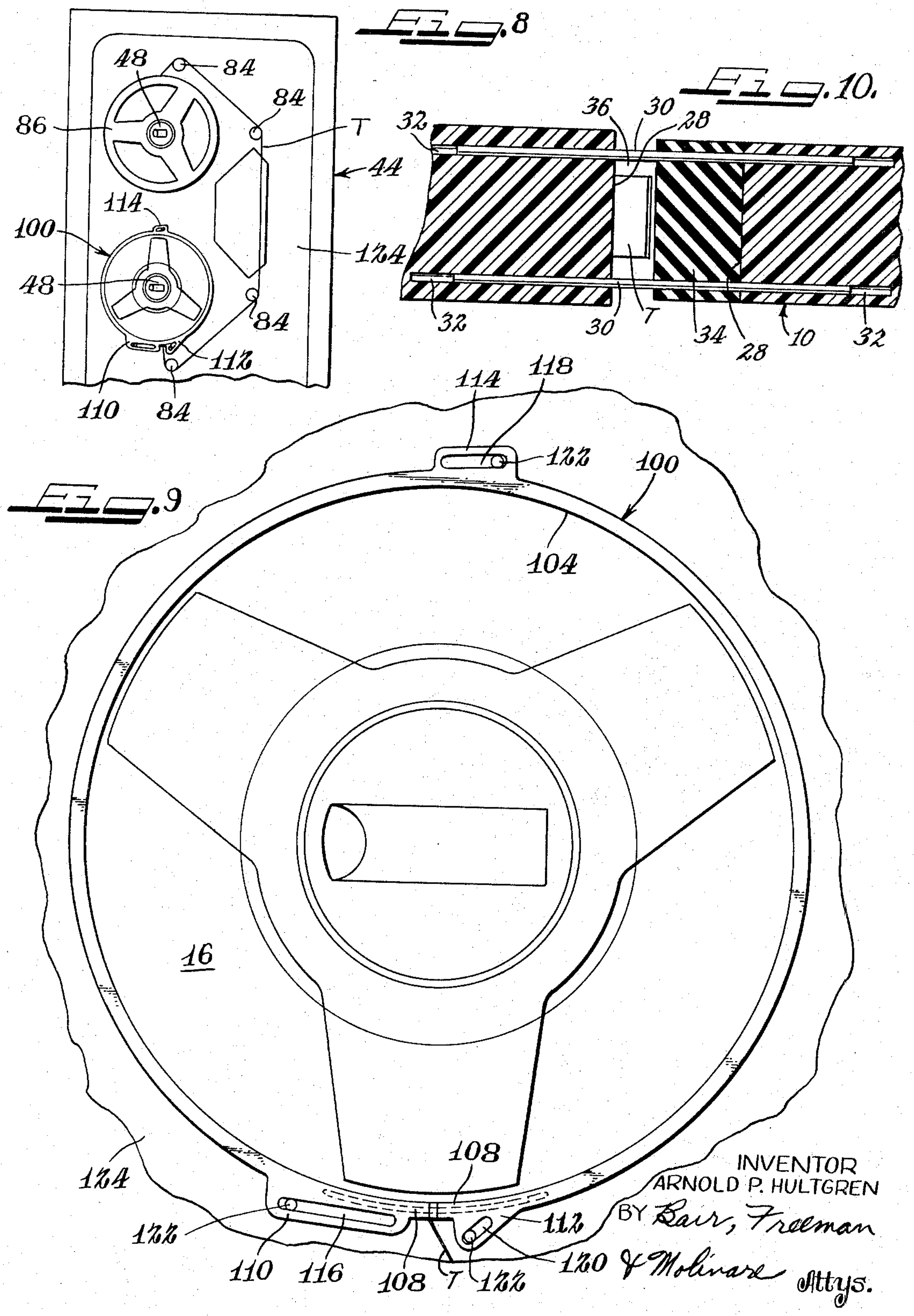
FIGURE 8 is a top plan view, similar to FIGURE 1, of another embodiment of my improved tape reel cover in position on cooperating apparatus which effects both an opening and a reclosing of a reel cover on a reel.
FIGURE 9 is an enlarged top plan view of the alternate tape reel cover and apparatus of FIGURE 8.
FIGURE 10 is an enlarged sectional view taken along the line 10—10 of FIGURE 5 except showing the reel cover in the open position.

Referring to FIGURES 8 and 9 there is shown an alternate embodiment tape reel cover 100 shown in place upon a computer apparatus or the like 44. As with the first embodiment 10, the cover 100 includes a wrap-around portion 104 which substantially conforms to the outer peripheries of the reel flanges 16 so as to completely enclose the space between the flanges and so that dust and air carried impurities do not come into contact with the tape T on the reel 12. Again, the cover 100 is desirably molded of a plastic material effective in withstanding relatively high impacts.

The inner surface of the wrap-around 104 is continuous and has grooves 22 which receive the outer edges of the flanges 16, just as with the cover 10. The details of construction of the cover 100 are actually substantially the same as the details of the first embodiment 10, including providing guide means for maintaining alignment between the ends 108 of the reel cover 100 and providing a seal between the opposite ends 108.

The primary difference in the reel cover 100 is in the raised portions 110, 112 and 114 which are located along the outer periphery of the wrap-around 104. The raised portion 110 is at one end 108 of the cover 100, the raised portion 112 is at the opposite end 108 of the cover while the raised portion 114 is at a point circumferentially intermediate the two raised portions 110 and 112. Each of the raised portions includes elongated slots 116, 118, and 120 therein, the axes thereof which are substantially parallel with the axis of the cover 100 and reel 12. Referring to FIGURE 9, each slot slants or tapers outwardly from the periphery of the wrap-around portion 104 in a substantially clockwise direction. The inner surfaces of the slots 116, 118 and 120 actually define camming surfaces which register with fixed upright pin members 122 in the deck 124 of the computer 44. Each of the pins 122 cooperates with the corresponding camming slots 116, 118 and 120 to move the somewhat flexible cover 100 substantially radially outwardly from the circumference of the reel 12 or inwardly towards the reel 12 due to the taper of the slots upon manual or automatic rotation of the cover 100.

When the pin members 122 are at the outermost ends of the slots 116, 118 and 120, the cover 100 is in closing engagement with the reel, and when the pins are at the innermost ends of the slots, the cover 100 is separated from the reel 12 to thereby permit free rotation of the reel 12 with respect to the cover 100.

As seen in FIGURE 9, each slot 116, 118 or 120 is at a length and angle different from another slot. Referring to FIGURE 9, when it is desired to open the cover with respect to the reel, the cover 100 is manually grasped and rotated in a clockwise direction. During this time, the slot 120 is moved relative to its cooperating pin 122 along a relatively steep angle and in a relatively short distance, in comparison to the movement of the slots 116 and 118 with respect to their cooperating pins 122. The pin 122 moves in the slot 116 a relatively long distance and along a shallow angle. This difference in relative movement of ends 108 opens the space therebetween so that tape on the reel readily passes between the opposite, opened ends 108. Thus, one end of the cover moves considerably more in distance than the other end of the cover so that when the cover has been completely separated from the reel it tends to take an oval shape.

The above embodiment operates in a similar manner to the first embodiment of FIGURES 1–7 since the operator never needs to grasp the flanges of the reel in order to effect a separation of the cover 100 from engagement therewith. One difference is that rather than having means for radially moving the cover, the cover is manually rotated to effect the desired opening.

It is seen from the foregoing, that in each described embodiment, the operator is never required to grasp the flanges 16 or to handle the reel 12 without the cover 10 thereon. By providing apparatus 42 directly upon the machine 44 for effectively opening and reclosing the cover 10 with respect to the reel 12, no damage is done to laterally projecting edges of the tape stored between the flanges 16. In this way a primary disadvantage of all known prior art tape reel covers is substantially avoided.

While in the foregoing there has been provided a detailed description of particular embodiments of the present invention, it is to be understood that all equivalents obvious to those having skill in the art are to be included within the scope of the invention as claimed.

What I claim and desire to secure by Letters Patent is:

1. In apparatus used in connection with tape or the like stored on a reel and including a deck, rotatable means mounted on said deck, a reel mounted on said rotatable means and having spaced-apart flanges for receiving tape therebetween, a wrap-around expansible cover substantially conforming to the outer periphery of said flanges and enclosing the space formed therebetween, spaced grooves in the inner periphery of said wrap-around cover for receiving said flanges therein in dust-sealing and spaced-apart relationship when said cover is mounted on said reel, the improvement comprising slots in said deck spaced radially outwardly from said rotatable means, upright pin members extending through said slots, apertures spaced along the outer periphery of said wrap-around cover for registering with said pin members, and means mounted on said deck for moving said pin members in said slots to cause said cover to move into and out of sealing engagement with said reel flanges.

2. In apparatus used in connection with tape or the like stored on a reel and including a frame, rotatable means on said frame, a reel having spaced apart flanges and mounted on said rotatable means, a wrap-around cover member substantially conforming to the outer periphery of said flanges for substantially enclosing the space formed therebetween, and means on said wrap-around cover for maintaining said flanges in a spaced-apart condition when the cover is positioned on said reel, the improvement comprising fixed actuating means mounted on said frame, and means on said cover for engaging said fixed means, said cover member being movable with respect to said fixed means so that upon movement of said cover member, said engaging means and said fixed means cause selective release or positioning of said cover with respect to said reel.

3. The improvement of claim 2 wherein said fixed means include fixed upright pin members and said cover means includes upright slotted bosses which cooperate with said upright pin members, said slotted portions having camming surfaces which engage said pin members for moving said reel cover with respect to said reel upon rotation of said cover in order to effect selective opening or closing of said cover on said reel in response to said rotation.

4. In apparatus used in connection with tape and the like stored on a reel and including a deck, rotatable means mounted on said deck, said reel being mounted on said rotatable means and having spaced-apart flanges for receiving tape therebetween, a wrap-around cover substantially conforming to the outer periphery of said flanges, and enclosing the space formed therebetween, spaced grooves in the inner periphery of said wrap-around cover for receiving said flanges therein in dust sealing and spaced-apart relationship when said cover is mounted on said reel, the improvement comprising a plurality of upright pin members in said deck spaced radially outwardly from said rotatable means and from said reel, a plurality of bosses, with upright longitudinal slots therein in the outer periphery of said wrap-around portion, said slots being in registry with said upright pin members, the surfaces of said slots defining camming surfaces which cause outward movement of said reel cover as said cover is rotated with respect to said reel to thereby cause selective opening or closing of said cover on said reel in response to said rotation.

5. Apparatus useful with a wrap-around type cover for a tape reel wherein said cover includes means for causing either a selective release or a positioning of said cover from or on said reel, said apparatus comprising a frame, a slot means in said frame, rotatable spindle means mounted on said frame for rotatably receiving said reel, means mounted on said frame and movable in said slot means for registering with the means on said cover, and means for moving said movable means whereby said cover is either positioned on or released from said reel in response to the movement of said movable means.

6. Apparatus useful with a wrap-around type cover for a tape reel wherein said cover includes apertures spaced along its outer periphery, said apparatus comprising a frame, rotatable means mounted on said frame for rotatably receiving said reel, slots in said frame and spaced outwardly from said rotatable means, movable upright pin members mounted on said frame for registering with the apertures in said wrap-around cover and being movable in said slots, and drive means for moving said pin members whereby the movement of said pin members effects either a release of or a positioning of said cover from or on said reel.

7. A cover for a tape reel having spaced flanges and being used in connection with apparatus which includes movable means for effecting either a release or positioning of said cover from or on said reel, said cover comprising a wrap-around portion substantially conforming to the outer periphery of said flanges and for substantially enclosing the space formed therebetween, means registering with the movable means on said apparatus in order to effect a selective release or a positioning of said cover from or on said reel, and means on said wrap-around portion for maintaining the opposite ends of said wrap-around portion in an aligned condition whether said cover is positioned on or released from said reel.

8. A cover for a tape reel having spaced-apart flanges and being useful in connection with apparatus which includes fixed means for selectively releasing a cover from said reel or positioning said cover on said reel, said cover comprising a wrap-around portion substantially conforming to the outer periphery of said flanges and enclosing the space formed therebetween, and means on the outer periphery of said wrap-around portion for engaging said fixed means on said apparatus in order to effect either opening or closing of said cover with respect to said reel in response to movement of said cover with respect to said fixed means.

9. A cover for a tape reel having spaced-apart flanges and being used in connection with apparatus which includes fixed means for selectively releasing said cover from said reel or positioning said cover on said reel, said cover comprising a wrap-around portion substantially conforming to the outer periphery of said flanges and for substantially enclosing the space formed between said flanges, raised portions on the outer periphery of said wrap-around portion, upright slots in said raised portions for engaging said fixed means on said apparatus, said slots being movable with respect to said fixed means upon rotation of said cover with respect to said reel, said slots being arranged and constructed to effect either outward or inward movement of said cover with respect to said reel in order to effect either a release or positioning thereof with respect to said reel and permit free rotation of said reel with respect to said cover.

10. The device of claim 9 wherein said slots include camming surfaces which, upon rotation of said cover, engage said fixed means to move said cover to or away from engagement with the flanges of said reel.

11. The device of claim 10 wherein two slots are provided at the opposite ends of said wrap-around portion and one slot is at a point intermediate said opposite ends.

12. A cover for a tape reel having spaced-apart flanges and being used in connection with apparatus which includes means for selectively releasing said cover from said reel or positioning said cover on said reel, said cover comprising a wrap-around portion substantially conforming to the outer periphery of said flanges and for substantially enclosing the space formed between said flanges, means on said wrap-around portion for registering with the means provided on said apparatus in order to effect either a release or a positioning of said cover with respect to said reel, and guide means fixed to one end of said wrap-around portion and circumferentially projecting therefrom, said guide means being slidably positioned in the opposite end of said wrap-around portion whereby said tape reel cover ends are maintained in an aligned condition whether the cover is mounted upon or released from said reel.

13. The device of claim 12 wherein said projecting means comprises a pair of spaced wire members fixed in one end of said wrap-around portion, the spacing of said wire members being greater than the width of the tape stored on said reel so that said tape may project therebetween.

14. The device of claim 12 wherein sealing means are provided at the meeting point of the opposite ends of said wrap-around portion so that the tape stored on said reel is maintained in a substantially dust-free condition when the cover is in place on said reel.

15. A cover for a tape reel having spaced-apart flanges and being useful with apparatus which includes a plurality of members movable for selectively releasing said cover from said reel or positioning said cover on said reel, said cover comprising a wrap-around portion substantially conforming to the outer periphery of said flanges and for substantially enclosing the space formed therebetween, groove means provided on the inner periphery of said wrap-around portion for maintaining said flanges in spaced-apart condition when said cover is mounted on said reel, a plurality of members provided on said wrap-around portion for engaging said movable means on said apparatus in order to effect either a release or a positioning of said cover with respect to said reel in response to movement of said movable means, a pair of guide members extending from one end of said tape reel and being slidably received by the opopsite end of said cover for mounting the ends of said cover in an aligned condition at all times, the guide members being spaced apart a distance greater than the width of the tape stored on said reel in order that said tape may project therebetween.

16. The device of claim 15 wherein said groove means remain in substantial alignment with said flanges whether the cover is mounted upon or released from said reel.

17. A cover for a tape reel having spaced-apart flanges and being useful with apparatus which includes movable upright pin members which cause the release of or the positioning of said cover from or on said reel, said cover comprising a wrap-around portion substantially conforming to the outer periphery of said flanges and for substantially enclosing the spaced formed therebetween, grooves provided on the inner periphery of said wrap-around portion in order to maintain said flanges in a spaced-apart condition when said cover is mounted on said reel, apertures provided on the outer periphery of said wrap-around portion for registering with said upright pin members whereby, in response to the movement of said movable pin members, said cover is either mounted upon or released from said reel, a pair of wire members circumferentially extending from one end of said wrap-around portion and being slidably received in the opposite end of said wrap-around portion in order to maintain the opposite ends of said cover in an aligned condition at all times, the spacing between said wire members being greater than the width of the tape stored on said reel so that said tape projects therebetween, and sealing means mounted on said wrap-around portion for substantially enclosing the space formed between the opposite ends of said wrap-around portion, said sealing means also having a slot for permitting the passage of tape therethrough.

18. A cover for a computer tape reel having spaced molded plastic flanges and being used in connection with apparatus which includes movable means for effecting either a release or a positioning of said cover from or on said reel, said cover comprising a molded plastic wrap-around portion, means on said wrap-around portion for normaly enclosing the space between the outer periphery of said flanges in a dust sealing condition, means on said wrap-around portion for cooperating with said movable means for effecting a selective release of said cover from dust sealing releationship with said reel or for a positioning of said cover in dust sealing relationship with said reel, and means connected to said wrap-around portion for maintaining the opposite ends of said wrap-around portion in an aligned condition whether said cover is positioned on or released from said reel.

19. The device of claim 18 wherein means are provided on said wrap-around portion for permitting the passage of computer tape from said reel outwardly from said wrap-around portion.

20. The device of claim 19 wherein said permitting means is an opening provided intermediate the ends of said wrap-around portion.

21. The device of claim 19 wherein said permitting means is an opening.

22. The device of claim 18 wherein means are provided for assuring dust sealing relationship between the opposite ends of said wrap-around portion.

23. Apparatus useful with a wrap-around type cover for a magnetic computer tape reel having spaced flanges wherein said cover includes closure means for permitting a selective release or a positioning of said cover from or on said reel, means are provided on said cover for maintaining the opposite ends of said wrap-around cover in an aligned position, and means are provided on the inner periphery of said wrap-around cover for providing dust sealing relationship between the flanges of said reel and said cover, said apparatus comprising a computer machine frame, rotatable means on the frame for receiving and rotating the reel, and movable means carried by said frame for positively engaging the closure means on said cover for releasing said cover from dust sealing engagement with said reel flanges while causing said dust sealing means on said wrap-around portion to remain in an aligned position with the reel flanges and while causing said oposite end maintaining means to retain the opposite ends of said wrap-around cover in an aligned position or for positioning said cover in said dust sealing engagement with said reel flanges.

24. The apparatus of claim 23 wherein said movable means includes at least one pin carried by said frame for engaging said closure means on said cover, and means are provided for moving said pin outwardly from said cover for releasing the wrap-around cover from the reel flanges.

25. The apparatus of claim 23 wherein means are provided on the frame for limiting the movement of said wrap-around away from said cover.

References Cited

UNITED STATES PATENTS

| | | | |
|---|---|---|---|
| 2,483,729 | 10/1949 | Greenleaf | 242—54.1 |
| 2,487,170 | 11/1949 | Nygaard | 242—54.1 |
| 3,035,786 | 5/1962 | Pieplow et al. | 242—55.13 |
| 3,186,321 | 6/1965 | Kimrey et al. | 95—31 |

LEONARD D. CHRISTIAN, *Primary Examiner.*